(12) United States Patent
Wilson

(10) Patent No.: US 6,183,041 B1
(45) Date of Patent: Feb. 6, 2001

(54) AIR DEFLECTOR HAVING MULTIPLE TANDEM AIRFOILS

(76) Inventor: Stephen T. Wilson, 2050 W. 89A, #157, Cottonwood, AZ (US) 86326

(*) Notice: Under 35 U.S.C. 154(b), the term of this patent shall be extended for 0 days.

(21) Appl. No.: 09/307,488

(22) Filed: May 10, 1999

(51) Int. Cl.[7] ...................................................... B60J 1/00
(52) U.S. Cl. ................................ 296/180.1; 296/180.2; 296/180.5
(58) Field of Search .............................. 296/180.1, 180.2, 296/180.5, 180.3, 50, 37.7, 51; 180/903; 244/213, 130, 216

(56) References Cited

U.S. PATENT DOCUMENTS

| 1,196,762 | * | 9/1916 | Cunningham | 296/37.7 |
|---|---|---|---|---|
| 2,357,203 | * | 8/1944 | Jimmes | 296/37.7 |
| 2,464,979 | * | 3/1949 | Hyatt | 296/37.7 |
| 3,061,244 | * | 10/1962 | Max | 244/42 |
| 3,084,825 | * | 4/1963 | Hultquist | 296/37.7 |
| 3,524,672 | * | 8/1970 | Rawlings | 296/180.1 |
| 3,874,617 | * | 4/1975 | Johnson | 244/42 |
| 4,533,168 | * | 8/1985 | Janssen et al. | 296/180.1 |
| 4,558,898 | * | 12/1985 | Deaver | 296/180.1 |
| 4,867,362 | * | 9/1989 | Finnegan et al. | 296/37.7 |
| 4,867,499 | * | 9/1989 | Stephan et al. | 296/180.1 |
| 4,902,066 | * | 2/1990 | Norman | 296/180.1 |
| 4,904,015 | | 2/1990 | Haines | 296/180.3 |
| 4,995,575 | | 2/1991 | Stephenson | 244/216 |
| 5,013,081 | * | 5/1991 | Cronce et al. | 296/180.1 |
| 5,092,648 | | 3/1992 | Spears | 296/180.3 |
| 5,232,260 | | 8/1993 | Lippard | 296/51 |
| 5,411,312 | * | 5/1995 | Stallings | 296/180.1 |
| 5,429,411 | * | 7/1995 | Spears | 296/180.1 |
| 5,456,512 | * | 10/1995 | Gibbs et al. | 296/37.7 |
| 5,516,178 | * | 5/1996 | Grant | 296/180.5 |
| 5,653,493 | * | 8/1997 | Spears | 296/180.2 |
| 5,688,020 | * | 11/1997 | Burg | 296/180.1 |

FOREIGN PATENT DOCUMENTS

| 599 867 | * | 12/1977 | (CH) | 296/37.7 |
|---|---|---|---|---|
| 2912612 | * | 10/1980 | (DE) | 296/180.1 |
| 004102559 | * | 7/1992 | (DE) | 296/180.1 |
| 2546116 | * | 11/1984 | (FR) | 296/37.7 |
| 2581943 | * | 11/1986 | (FR) | 296/180.1 |

* cited by examiner

Primary Examiner—Joseph D. Pape
Assistant Examiner—Kiran Patel
(74) Attorney, Agent, or Firm—Richard L. Miller, P.E.

(57) ABSTRACT

An air deflector that includes a frame, multiple airfoils, and apparatus for adjusting the angle of attack of the air deflector. The frame includes a pair of side fences. The multiple airfoils include three airfoils, each which has a negative chamber for increasing downward force and traction and extends perpendicularly laterally from one side fence to another side fence. The three airfoils are disposed in such a tandem orientation that airflow thereacross is laminar which eliminates turbulence so as to minimize boundary layer separation and eddies resulting thereby and slip caused thereby. Air flowing over a forwardmost airfoil flows through a first air space and under an intermediate airfoil and air flowing over the intermediate airfoil flows through a second air space and under a rearwardmost airfoil so as to eliminate wake formation at the trailing edges of the forwardmost airfoil and the intermediate airfoil. The forwardmost airfoil has an angle of attack that is shallow relative to the frame, the intermediate airfoil has an angle of attack that is larger than the angle of attack of the forwardmost airfoil, and the rearwardmost airfoil has an the angle of attack that is larger than the angle of attack of the intermediate airfoil so as to provide a progressively increasing angle of attack for the air deflector that gently, but progressively, diverts airflow upwardly at a controlled rate to prevent stall.

43 Claims, 4 Drawing Sheets

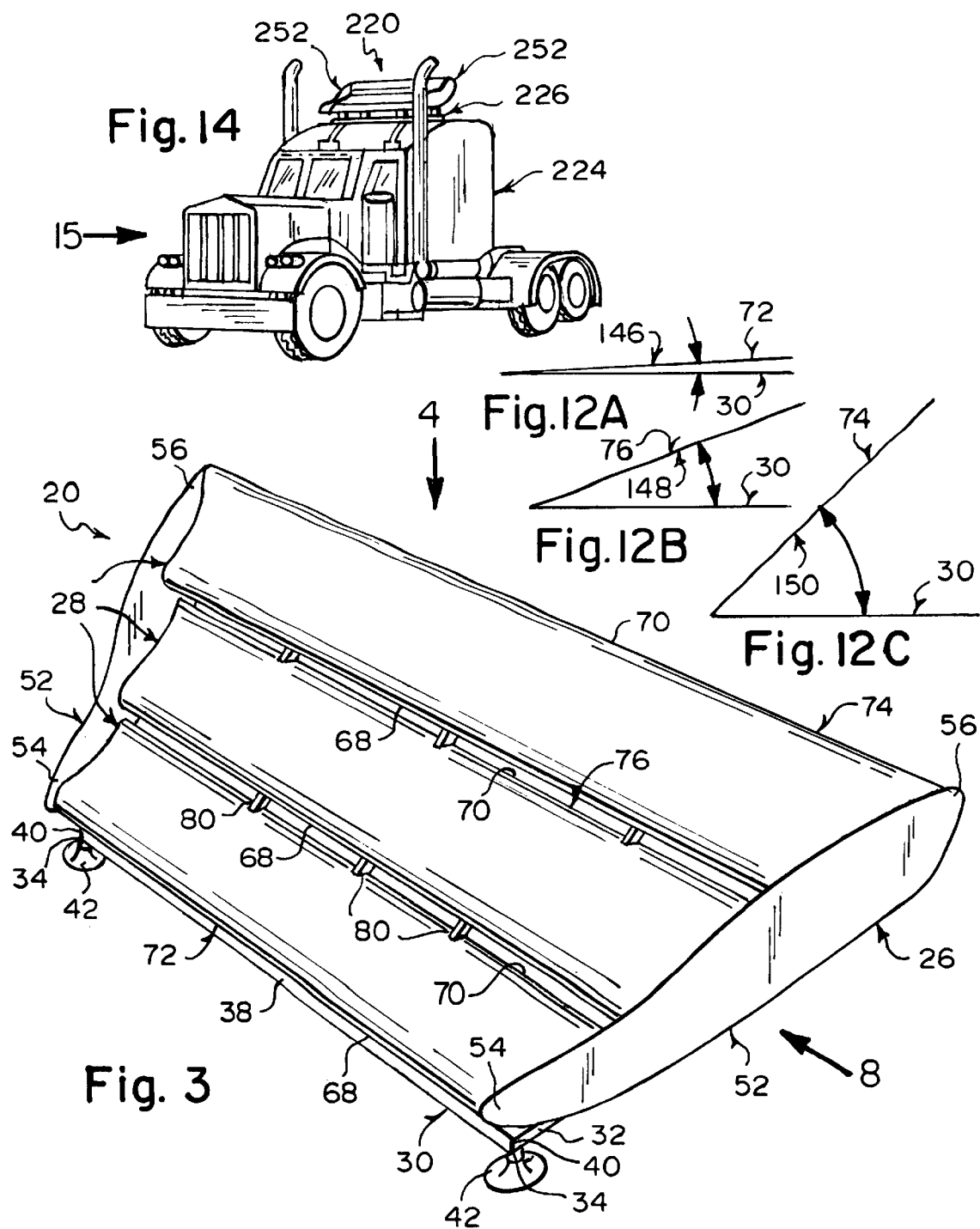

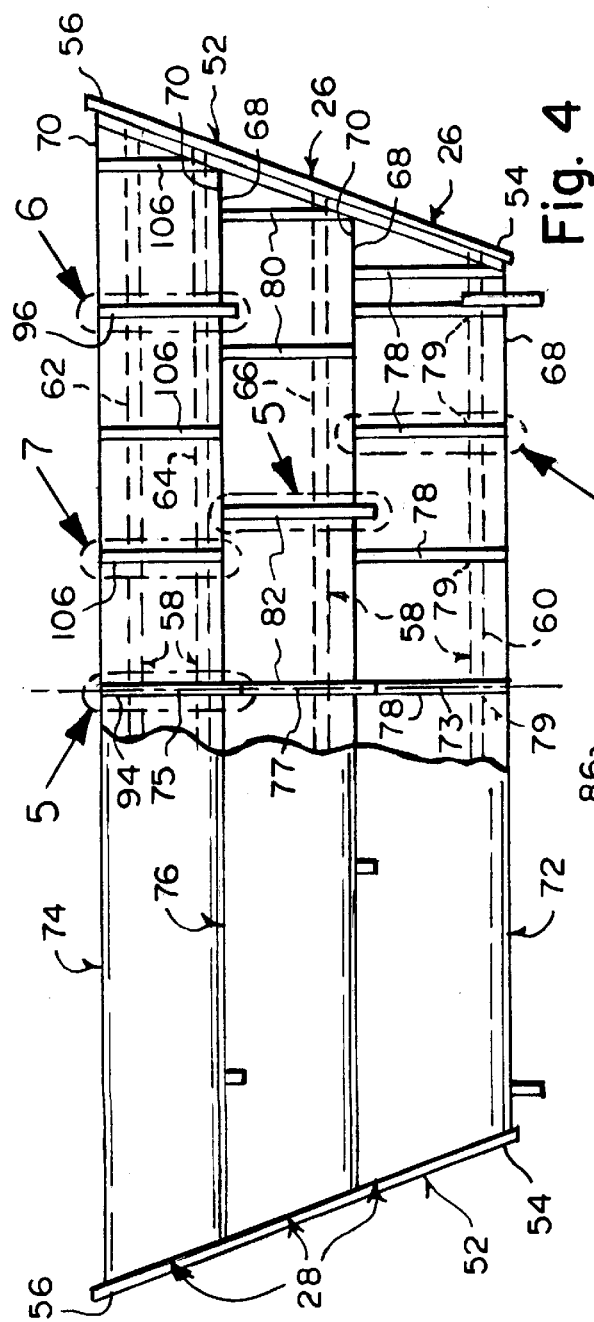

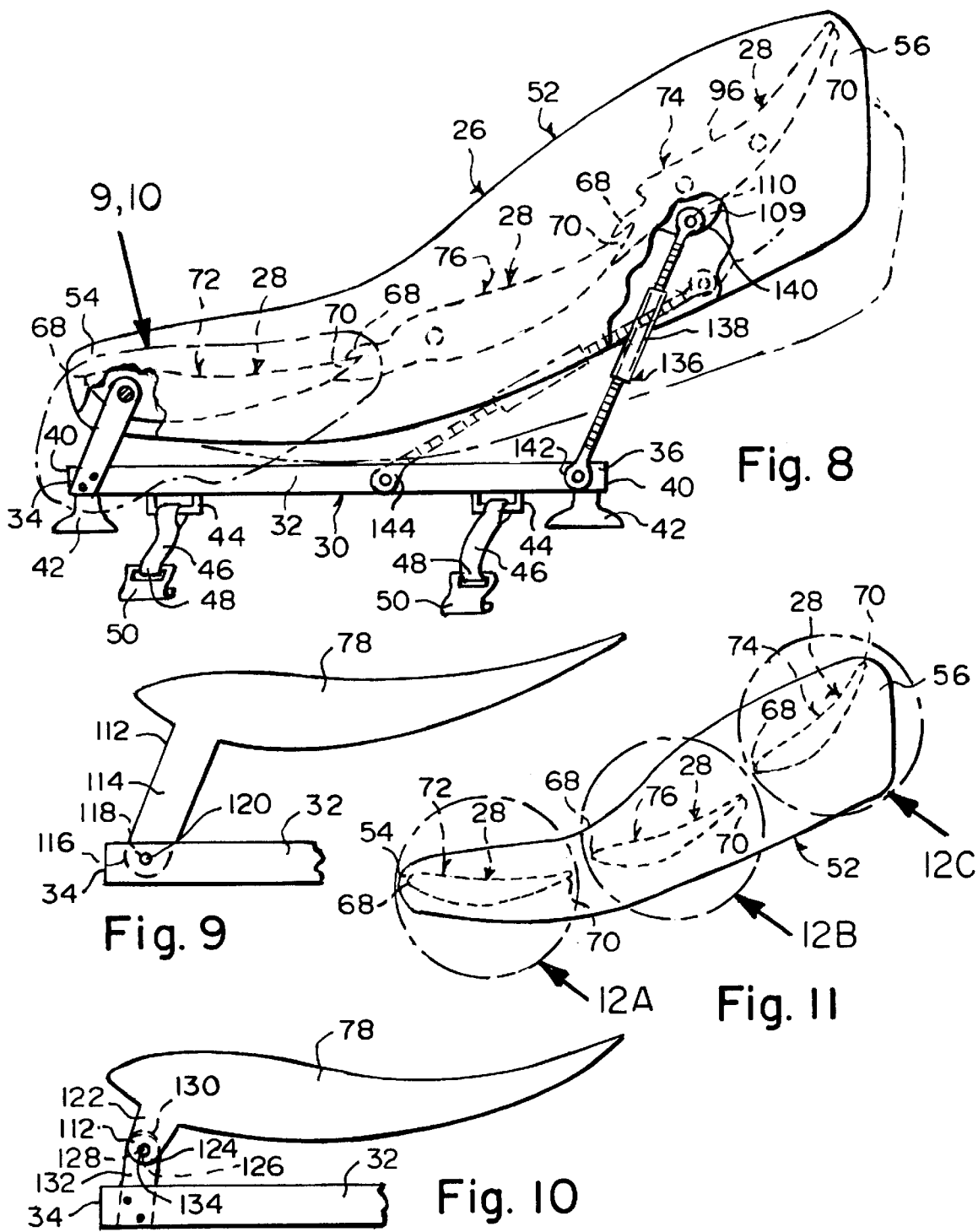

AIR DEFLECTOR HAVING MULTIPLE TANDEM AIRFOILS

BACKGROUND OF THE INVENTION

1. Field of the Invention

The present invention relates to an air deflector. More particularly, the present invention relates to an air deflector having multiple airfoils disposed in tandem to the direction of travel and having increasing pitches.

2. Description of the Prior Art

Air deflectors came into general public acceptance during the seventies when the trucking industry was faced with escalating transportation costs due to rising fuel prices.

The recreational filed, also feeling this bite, wanted the same technology to benefit them, so a market was created by using scaled down foils and deflectors to fit automobiles and pick-up trucks which pulled travel trailers.

These RV market was able to find some savings in fuel expenses with these devices, but not much in the way of stability, traction, and reduced turbulence. Although, not nearly to the percentile extent as the trucking industry enjoyed, for two main reasons: height and width differential.

First height. Although, there is much variety in size, most tractors are only about three and one half feet lower than the trailers they pull, whereas, cars and trucks can be as much a seven feet lower than their trailers. To be effective, air has to be deflected up at a much more extreme angle than their tractor trailer counterparts due to the increased wind resistance caused by the increased frontal area of the trailer.

In attempting to divert air high in such a short span (tow vehicle's roof to trailer), as stated supra, a foil must be mounted with a high angle of attack.

Second width. Most tractors are just as wide as their trailers, while cars and trucks can be three or more feet narrower than the trailers they pull, thus exposing additional frontal area to air resistance.

This resistance can be formidable as it has been calculated that on a level road with no wind, a tow vehicle pulling a travel trailer at highway speeds uses 50% of it power expended just to overcome air resistance.

Most airfoil devices have been helpful in the RV market, but the current technology in the deflectors and scaled down airfoils available today do not offer the best efficiencies. This, mainly because they overlook width differentials, and disregard aerodynamic principles.

By their design, single foils, and especially deflectors, create a vacuum pocket to form behind them which causes much of the air they are intended to deflect, instead, to "pinch in"which partially defeats the purpose.

Air deflectors tend to help somewhat with width differential because they "splatter" the oncoming air away in all directions, but they create a high amount of drag in doing so.

Airfoils available today are somewhat more efficient, but one of their problems, since they were initially designed for trucking, is that they supply little, if any, assistance to the width/drag dilemma. The sides (or fences) of these airfoil products run parallel to the direction of travel, and serve only to support the single foil-shaped component between them.

Numerous innovations for air deflectors have been provided in the prior art that will be described. Even though these innovations may be suitable for the specific individual purposes to which they address, however, they differ from the present invention.

A FIRST EXAMPLE, U.S. Pat. No. 4,867,499 to Stephan et al. teaches a tailgate for a pickup truck that includes three elongate, rectangular panels or louvers having an airfoil-shaped cross section pivotally mounted in a U-shaped tailgate frame conformed to be mounted on a pickup truck in place of the conventional tailgate. The louvers are linked to each other for coordinated pivotal movement about respective horizontal axes extending along the leading edge of the airfoil section between a closed position and an open position wherein the louvers project rearwardly from the frame to accommodate a substantially unrestricted flow of air through the tailgate. A reversible electric motor controlled from the cab drives the louvers in pivotal movement through a worm gear drive which holds the louvers at any selected position. An airfoil section wing is mounted at the rearward end of the truck cab in spaced relationship to the cab roof and sidewalls to reduce turbulence in air flowing towards the tailgate.

Stephan et al. teaches multiple airfoils that are not disposed in tandem to the direction of travel, but rather spaced vertically apart from each other in the direction of travel so that airflow thereacross is not laminar which creates turbulence so as to maximize boundary layer separation and the resulting eddies and slip caused thereby.

Wake formation at the trailing edges of the multiple airfoils of Stephan et al. is not eliminated by virtue of the fact that the air flowing over the multiple airfoils is not prevented from separating at the trailing edges thereof.

A SECOND EXAMPLE, U.S. Pat. No. 4,904,015 to Haines teaches a tractor and trailer coupled together in tandem towing relationship that is provided with an air deflector system attached to the tractor for aerodynamically reducing the drag on such combination by enclosing the space between the cab of the tractor and the trailer. A support means is attached to the frame of the tractor. A top air fairing is movably attached to the support means for extending from the top of the cab to the top of the trailer. Two side fairings are movably attached to the support means for extending from the rear of the cab to the trailer, and wherein the side fairings mate with the top fairing. A means is provided for moving the fairings from one position to another based upon the alignment between the trailer and the tractor.

A THIRD EXAMPLE, U.S. Pat. No. 4,995,575 to Stephenson teaches actuation and support mechanisms for wing trailing edge flap systems wherein each flap system has a stream-wise or chord-wise pair of geometrically similar flap support assemblies. Each of the flap support assemblies has a chord-wise aligned cantilever support beam fixedly attached towing structure. The beam incorporates multiple cam tracks for providing guidance and support to a movable dual carriage assembly upon which a wing trailing edge flap assembly is mounted. The dual carriage assembly comprises a fore-carriage which is articulatably connected to an aft-carriage. The wing trailing edge flap assembly is mounted upon the aft-carriage. Both the fore-carriage and the aft-carriage are individually supported by rollers constantly engaging a separate cam track for each of said carriages. For actuation of the dual carriage assembly and the Owing trailing edge assembly mounted thereon, a ball screw drive mechanism is incorporated between the cantilever beam and the dual carriage assembly.

A FOURTH EXAMPLE, U.S. Pat. No. 5,092,648 to Spears teaches a plurality of spaced gates in the airflow control system on top of the tractor cab that opens up to permit a flow of air to impinge on the front face of the trailer to exert a braking force to augment the braking force exerted by the wheel brakes to slow down the tractor-trailer assembly.

A FIFTH EXAMPLE, U.S. Pat. No. 5,232,260 to Lippard teaches a pickup truck bed that has a split tailgate construction having a first gate member pivotally mounted in a parallel relationship relative to a second gate member positioned above the first gate member. The first gate member is arranged for pivotment to provide for airfoil orientation of the second gate member, with the first gate member arranged to permit pivotment of the first gate member against the floor of the pickup truck bed to permit airflow therethrough.

A SIXTH EXAMPLE, U.S. Pat. No. 5,688,020 to Burg teaches the pickup truck tailgate mounted drag reducing aerodynamic stabilizer or aero-stabilizer that acts as a turning vane(s) to direct air out over the tailgate thereby reducing drag, provides a stabilizing downward force on the aft end of the pickup truck during forward high speed operation of the pickup truck, and all of this is accomplished with an assembly that is out of the way when the tailgate is opened for carrying long boards or the like. The tailgate aero-stabilizer is a very simple, low cost, and easy to install device that can, in its preferred embodiment, be molded from one piece from weather resisting plastics or the like. An optional feature is a built in air braking device that can have as forces for actuation, in addition to aerodynamic forces, a torque spring, powered actuator, or other artificial force generator.

It is apparent that numerous innovations for air deflectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an air deflector having multiple airfoils disposed in tandem to the direction of travel and having increasing pitches that avoids the disadvantages of the prior art.

ANOTHER OBJECT of the present invention is to provide an air deflector having multiple airfoils disposed in tandem to the direction of travel and having increasing pitches that is simple and inexpensive to manufacture.

STILL ANOTHER OBJECT of the present invention is to provide an air deflector having multiple airfoils disposed in tandem to the direction of travel and having increasing pitches that is simple to use.

BRIEFLY STATED, YET ANOTHER OBJECT of the present invention is to provide an air deflector that includes a frame, multiple airfoils, and apparatus for adjusting the angle of attack of the air deflector. The frame includes a pair of side fences. The multiple airfoils include three airfoils, each which has a negative chamber for increasing downward force and traction and extends perpendicularly laterally from one side fence to another side fence. The three airfoils are disposed in such a tandem orientation that airflow thereacross is laminar which eliminates turbulence so as to minimize boundary layer separation and eddies resulting thereby and slip caused thereby. Air flowing over a forwardmost airfoil flows through a first air space and under an intermediate airfoil and air flowing over the intermediate airfoil flows through a second air space and under a rearwardmost airfoil so as to eliminate wake formation at the trailing edges of the forwardmost airfoil and the intermediate airfoil. The forwardmost airfoil has an angle of attack that is shallow relative to the frame, the intermediate airfoil has an angle of attack that is larger than the angle of attack of the forwardmost airfoil, and the rearwardmost airfoil has an the angle of attack that is larger than the angle of attack of the intermediate airfoil so as to provide a progressively increasing angle of attack for the air deflector that gently, but progressively, diverts airflow upwardly at a controlled rate to prevent stall.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures on the drawing are briefly described as follows:

FIG. 3 is an enlarged diagrammatic perspective view of the area generally enclosed in the dotted curve identified by arrow 3 in FIGS. 1 and 2 of the first embodiment of the present invention shown in FIGS. 1 and 2;

FIG. 4 is an enlarged diagrammatic top plan view, in partial section, taken generally in the direction of arrow 4 in FIG. 3;

FIG. 5 is an enlarged diagrammatic side elevational view of the area generally enclosed by the dotted curve identified by arrow 5 in FIG. 4 of a first type spar of the present invention;

FIG. 6 is an enlarged diagrammatic side elevational view of the area generally enclosed by the dotted curve identified by arrow 6 in FIG. 4 of a second type spar of the present invention;

FIG. 7 is an enlarged diagrammatic side elevational view of the area generally enclosed by the dotted curve identified by arrow 7 in FIG. 4 of a third type spar of the present invention;

FIG. 8 is an enlarged diagrammatic side elevational view, in partial section, taken generally in the direction of arrow 8 in FIG. 3 of the adjusting apparatus and a first embodiment of the front support hinge of the present invention;

FIG. 9 is an enlarged diagrammatic side elevational view of the area generally enclosed by the dotted curve identified by arrow 9 in FIG. 8 of a second embodiment the front support hinge of the present invention;

FIG. 10 is an enlarged diagrammatic side elevational view of the area generally enclosed by the dotted curve identified by arrow 10 in FIG. 8 of a third embodiment the front support hinge of the present invention;

FIG. 11 is a diagrammatic side elevational view illustrating the progressively increasing pitches of the multiple tandem airfoils of the present invention communicating smoothly with each other;

FIG. 12A is a diagrammatic view of the area generally enclosed in the dotted curve identified by arrow 12A in FIG. 11 of the pitch of the leading airfoil of the present invention;

FIG. 12B is a diagrammatic view of the area generally enclosed in the dotted curve identified by arrow 12B in FIG. 11 of the pitch of the intermediate airfoil of the present invention;

FIG. 12C is a diagrammatic view of the area generally enclosed in the dotted curve identified by arrow 12C in FIG. 11 of the pitch of the trailing airfoil of the present invention;

FIG. 14 is a diagrammatic perspective view of a second embodiment of the present invention having parallel fences installed on the roof of the cab of a tractor trailer.

LIST OF REFERENCE NUMERALS UTILIZED IN THE DRAWING

Figure 1:
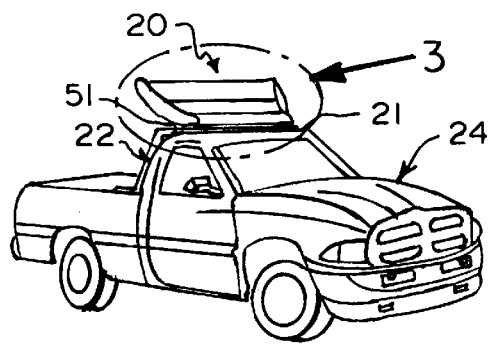
FIG. 1 is a diagrammatic perspective view of a first embodiment of the present invention having rearwardly outwardly flaring side fences installed on the roof of the cab of a pick-up truck.

First Embodiment 20 air deflector of the present invention
21 roof of cab 22 of pick-up truck 24
22 cab of pick-up truck 24
24 pick-up truck
26 frame for attaching to roof 21 of cab 22 of pick-up truck 24
28 multiple airfoils
30 base of frame 26
32 pair of longitudinal members of base 30 of frame 26
34 forwardmost terminal ends of pair of longitudinal members 32 of base 30 of frame 26
36 rearwardmost terminal ends of pair of longitudinal members 32 of base 30 of frame 26
38 pair of lateral members of base 30 of frame 26
40 corners of base 30 of frame 26
42 four suction cups of base 30 of frame 26 for engaging roof 21 of cab 22 of pick-up truck 24
44 four bars of base 30 of frame 26
46 four straps of base 30 of frame 26
48 terminal end of each strap of four straps 46 of base 30 of frame 26
50 four clasps of base 30 of frame 26 for engaging cab 22 of pick-up truck 24
51 bed rail mounting system of base 30 of frame 26 for engaging cab 22 of pick-up truck 24
52 pair of side fences of frame 26
54 leading ends of pair of side fences 52 of frame 26
56 trailing ends of pair of side fences 52 of frame 26
58 four rods of frame 26
60 forwardmost rod of four rods 58 of frame 26
62 rearwardmost rod of four rods 58 of frame 26
64 rearwardmost intermediate rod of four rods 58 of frame 26
66 forwardmost intermediate rod of four rods 58 of frame 26
68 leading edge of each airfoil of three airfoils of multiple airfoils 28
70 trailing edge of each airfoil of three airfoils of multiple airfoils 28
72 forwardmost airfoil of three airfoils of multiple airfoils 28
73 lateral centerline of forwardmost airfoil 72 of three airfoils of multiple airfoils 28
74 rearwardmost airfoil of three airfoils of multiple airfoils 28
75 lateral centerline of rearwardmost airfoil 74 of three airfoils of multiple airfoils 28
76 intermediate airfoil of three airfoils of multiple airfoils 28
77 lateral centerline of intermediate airfoil 76 of three airfoils of multiple airfoils 28
78 plurality of first type spars contained in forwardmost airfoil 72 of three airfoils of multiple airfoils 28
79 first throughbore in each first type spar of plurality of first type spars 78 contained in forwardmost airfoil 72 of three airfoils of multiple airfoils 28
80 plurality of second type spars contained in intermediate airfoil 76 of three airfoils of multiple airfoils 28
81 leading ends of plurality of first type spars 78 contained in forwardmost airfoil 72 of three airfoils of multiple airfoils 28
82 plurality of third type spars further contained in intermediate airfoil 76 of three airfoils of multiple airfoils 28
83 trailing ends of plurality of first type spars 78 contained in forwardmost airfoil 72 of three airfoils of multiple airfoils 28
84 leading ends of plurality of third type spars 82 further contained in intermediate airfoil 76 of three airfoils of multiple airfoils 28
86 trailing ends of plurality of third type spars 82 further contained in intermediate airfoil 76 of three airfoils of multiple airfoils 28
88 second throughbore in each third type spar of plurality of third type spars 82 contained in intermediate airfoil 76 of three airfoils of multiple airfoils 28
90 support spacer on leading end 84 of each third type spar of plurality of third type spars 82 contained in intermediate airfoil 76 of three airfoils of multiple airfoils 28
92 first air space
94 fourth type spar contained in rearwardmost airfoil 74 of three airfoils of multiple airfoils 28
95 third throughbore in each fourth type spar 94 contained in rearwardmost airfoil 74 of three airfoils of multiple airfoils 28
96 plurality of fifth type spars contained in rearwardmost airfoil 74 of three airfoils of multiple airfoils 28
98 leading ends of plurality of fifth type spars 96 contained in rearwardmost airfoil 74 of three airfoils of multiple airfoils 28
100 trailing ends of plurality of fifth type spars 96 contained in rearwardmost airfoil 74 of three airfoils of multiple airfoils 28
102 fourth throughbore in each fifth type spar of plurality of fifth type spars 96 contained in rearwardmost airfoil 74 of three airfoils of multiple airfoils 28
104 fifth throughbore in each fifth type spar of plurality of fifth type spars 96 contained in rearwardmost airfoil 74 of three airfoils of multiple airfoils 28
105 second air space
106 plurality of sixth type spars further contained in rearwardmost airfoil of three airfoils of multiple airfoils 28
108 sixth throughbore in each sixth type spar of plurality of sixth type spars 106 further contained in rearwardmost airfoil of three airfoils of multiple airfoils 28
109 rear pivot support depending from support spacer 90 of each fifth type spar of plurality of fifth type spars 96 contained in rearwardmost airfoil 74 of three airfoils of multiple airfoils 28
110 pivot throughopening in rear pivot support 109 depending from support spacer 90 of each fifth type spar of plurality of fifth type spars 96 contained in rearwardmost airfoil 74 of three airfoils of multiple airfoils 28
112 front pivot support on each of pair of first type spars of plurality of first type spars 78 that evenly straddle lateral centerline 73 of forwardmost airfoil 72 of three airfoils of multiple airfoils 28
114 leg of front pivot support 112 on each of pair of first type spars of plurality of first type spars 78 that evenly straddle lateral centerline 73 of forwardmost airfoil 72 of three airfoils of multiple airfoils 28

116 free end of leg 114 of front pivot support 112 on each of pair of first type spars of plurality of first type spars 78 that evenly straddle lateral centerline 73 of forwardmost airfoil 72 of multiple airfoils 28

118 throughbore in free end 116 of leg 114 of front pivot support 112 on each of pair of first type spars of plurality of first type spars 78 that evenly straddle lateral centerline 73 of forwardmost airfoil 72 of multiple airfoils 28

120 pivot pin of front pivot support 112 on each of pair of first type spars of plurality of first type spars 78 that evenly straddle lateral centerline 73 of forwardmost airfoil 72 of three airfoils of multiple airfoils 28

122 leg of front pivot support 112 on each of pair of first type spars of plurality of first type spars 78 that evenly straddle lateral centerline 73 of forwardmost airfoil 72 of three airfoils of multiple airfoils 28

124 free end of leg 122 of front pivot support 112 on each of pair of first type spars of plurality of first type spars 78 that evenly straddle lateral centerline 73 of forwardmost airfoil 72 of three airfoils of multiple airfoils 28

126 throughbore in free end 124 of leg 122 of front pivot support 112 on each of pair of first type spars of plurality of first type spars 78 that evenly straddle lateral centerline 73 of forwardmost airfoil 72 of three airfoils of multiple airfoils 28

128 throughbore in free end 130 of another leg 132 of front pivot support 112 on each of pair of first type spars of plurality of first type spars 78 that evenly straddle lateral centerline 73 of forwardmost airfoil 72 of three airfoils of multiple airfoils 28

130 free end of another leg 132 of front pivot support 112 on each of pair of first type spars of plurality of first type spars 78 that evenly straddle lateral centerline 73 of forwardmost airfoil 72 of three airfoils of multiple airfoils 28

132 another leg of front pivot support 112 on each of pair of first type spars of plurality of first type airfoils 78 that evenly straddle lateral centerline 73 of forwardmost airfoil 72 of three airfoils of multiple airfoils 28

134 pivot pin of front pivot support 112 on each of pair of first type spars 78 that evenly straddle lateral centerline 73 of forwardmost airfoil 72 of three airfoils of multiple airfoils 28

136 apparatus for adjusting angle of attack of air deflector 20

138 pair of turnbuckles of apparatus 136 for adjusting angle of attack of air deflector 20

140 uppermost terminal end of each turnbuckle of pair of turnbuckles 138 of apparatus 136 for adjusting angle of attack of air deflector 20

142 lowermost terminal end of each turnbuckle of pair of turnbuckles 138 of apparatus 136 for adjusting angle of attack of air deflector 20

144 intermediate position on associated longitudinal member 32 of base 30 of frame 26

146 angle of attack of forwardmost airfoil 72 of three airfoils of multiple airfoils 28

148 angle of attack of intermediate airfoil 76 of three airfoils of multiple airfoils 28

150 angle of attack of rearwardmost airfoil 74 of three airfoils of multiple airfoils 28

Second Embodiment 220 air deflector of the present invention
224 tractor trailer
226 frame
252 pair of side fences of frame 226

DETAILED DESCRIPTION OF THE PREFERRED EMBODIMENT

If we look at an airfoil as an inverted aircraft wing, we will see the aerodynamic problems associated therewith.

The wing, at a shallow angle of attack, has a smooth airfoil and generates lift. As the angle of attack increases, however, the smooth flow turns turbulent, and the wing stalls.

In order to prevent this condition, usually faced during take-off and landing, the aircraft industry utilizes multiple foils in the wing called flaps and slats. These components arrayed at varying angles of attack allow the wing, as a whole, to assume a higher attack angle without stalling.

The airflow remains smooth over the entire surface, reducing or eliminating drag, while still retaining lift. This so-called segmented wing of separate foils was referred to by one pilot as "a magic carpet ride."

By re-inverting the wing, we can see how and why the present invention accomplishes its goal.

Individual foils, set at moderate angles of attack with regards to one another, re-route the airflow smoothly up, passing it onto the next foil without turbulence, resulting in a high-velocity up-rush of air at the final trailing edge, in a manner no single surface airfoil could accomplish. This is why currently available airfoils tend to be more deflectors than foils.

Figure 2:
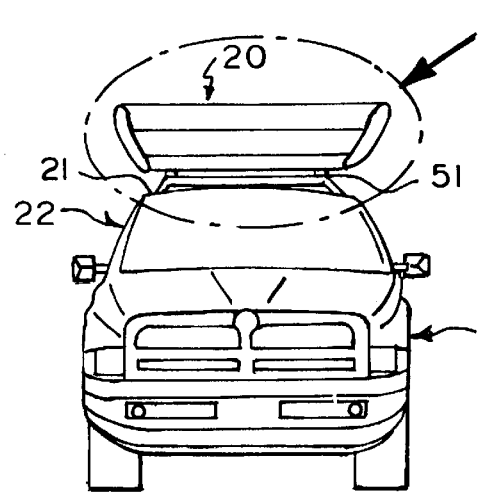
FIG. 2 is an enlarged diagrammatic front elevational view taken generally in the direction of arrow 2 in FIG. 1.

Referring now to the figures, in which like numerals indicate like parts, and particularly to FIGS. 1 and 2, a first embodiment of the air deflector of the present invention is shown generally at 20 for attaching to a roof 21 of a cab 22 of a pick-up truck 24 and having an angle of attack.

The configuration of the air deflector 20 can best be seen in FIGS. 3–12C, and as such, will be discussed with reference thereto.

The air deflector 20 comprises a frame 26 for attaching to the roof 21 of the cab 22 of the pick-up truck 24, and multiple airfoils 28 mounted to the frame 26.

The frame 26 comprises a base 30 that comprises a pair of longitudinal members 32 that are tubular and have forwardmost terminal ends 34 and rearwardmost terminal ends 36, and a pair of lateral members 38 that are tubular and rectilinearly connected to the pair of longitudinal members 32 of the base 30 of the frame 26, to form corners 40.

The base 30 of the frame 26 further comprises four suction cups 42, each of which depends from an associated corner 40 of the base 30 of the frame 26 for engaging the roof 21 of the cab 22 of the pick-up truck 24.

The base 30 of the frame 26 further comprises four bars 44 that are U-shaped, with a pair of each spaced-apart from each other and depending from an associated longitudinal member 32 of the base 30 of the frame 26.

The base 30 of the frame 26 further comprises four straps 46 that are flexible, each of which depends freely from an associated bar 44 of the base 30 of the frame 26, to a terminal end 48.

The base 30 of the frame 26 further comprises four clasps 50, each of which is freely disposed on the terminal end 48 of an associated strap 46 of the base 30 of the frame 26 for engaging the cab 22 of the pick-up truck 24.

Alternatively, the base 30 of the frame 26 can comprise a bed rail mounting system 51 (see FIGS. 1 and 2) for demonstrating inherent flexibility of use.

The frame 26 further comprises a pair of side fences 52 that are laterally spaced-apart from each other and generally rearwardly inclined, and have leading ends 54 and trailing ends 56.

Each side fence 52 of the frame 26 is pivotally mounted to an associated longitudinal member 32 of the base 30 of the frame 26.

The pair of side fences 52 of the frame 26 flare rearwardly outwardly from each other for providing a taller and wider surface for trailers that are wider and taller than the pick-up truck 24 towing them.

The frame 26 further comprises four rods 58 that are tandemly spaced-apart from, and parallel to, each other, and extend perpendicularly laterally from one side fence 52 of the frame 26 to another side fence 52 of the frame 26.

A forwardmost rod 60 of the frame 26 extends across the leading ends 54 of the pair of side fences 52 of the frame 26, a rearwardmost rod 62 of the frame 26 extends across the trailing ends 56 of the pair of side fences 52 of the frame 26, a rearwardmost intermediate rod 64 of the frame 26 extends forwardly of the rearwardmost rod 62 of the frame 26, and a forwardmost intermediate rod 66 of the frame 26 extends between the rearwardmost intermediate rod 64 of the frame 26 and the forwardmost rod 60 of the frame 26.

The multiple airfoils 28 comprise three airfoils that are tandemly spaced-apart from, and parallel to, each other, each of which has a negative chamber for increasing downward force and traction, and a leading edge 68 and a trailing edge 70, and extends perpendicularly laterally from one side fence 52 of the frame 26 to another side fence 52 of the frame 26.

A forwardmost airfoil 72 of the multiple airfoils 28 has a lateral centerline 73, a profile, and extends across the leading ends 54 of the pair of side fences 52 of the frame 26, with the forwardmost rod 60 of the frame 26 extending longitudinally therethrough, slightly rearwardly of the leading edge 68 of the forwardmost airfoil 72 of the multiple airfoils 28.

A rearwardmost airfoil 74 of the multiple airfoils 28 has a lateral centerline 75, a profile, and extends across the trailing ends 56 of the pair of side fences 52 of the frame 26, with the rearwardmost rod 62 of the frame 26 extending longitudinally therethrough, slightly forwardly of the trailing edge 70 of the rearwardmost airfoil 74 of the multiple airfoils 28, and with the rearwardmost intermediate rod 64 of the frame 26 extending longitudinal therethrough, slightly rearwardly of the leading edge 68 of the rearwardmost airfoil 74 of the multiple airfoils 28.

An intermediate airfoil 76 of the multiple airfoils 28 has a lateral centerline 77, a profile, and extends across the pair of side fences 52 of the frame 26, between, connected to, and spaced from, the forwardmost airfoil 72 of the multiple airfoils 28 and the rearwardmost airfoil 74 of the multiple airfoils 28, with the forwardmost intermediate rod 66 of the frame 26 extending longitudinal therethrough, slightly rearwardly of the leading edge 68 of the intermediate airfoil 76 of the multiple airfoils 28.

The forwardmost airfoil 72 of the multiple airfoils 28 contains a plurality of first type spars 78 that are parallel to each other and extend laterally and are longitudinally spaced-apart from each other, and have leading ends 81 and trailing ends 83.

Each first type spar 78 is shaped to match the profile of the forwardmost airfoil 72 of the multiple airfoils 28, and has a first throughbore 79 that is disposed slightly rearwardly of the leading end 81 thereof that receives the forwardmost rod 60 of the frame 26 therethrough.

One first type spar 78 extends along the lateral centerline 73 of the forwardmost airfoil 72 of the multiple airfoils ,8, with remaining first type spars 78 disposed outboard of, and to both sides of, the one first type spar 78.

The intermediate airfoil 76 of the multiple airfoils 28 contains a plurality of second type spars 80 that are identical to the plurality of first type spars 78, are parallel to each other, and extend laterally and are longitudinally spaced-apart from each other.

The intermediate airfoil 76 of the multiple airfoils :28 further contains a plurality of third type spars 82 that are parallel to each other and have leading ends 84 and trailing ends 86.

Each third type spar 80 is shaped to match the profile of the intermediate airfoil 76 of the multiple airfoils 28, and has a second throughbore 88 that receives the forwardmost intermediate rod 66 of the frame 26 therethrough.

One third type spar 82 extends along the lateral centerline 77 of the intermediate airfoil 76 of the multiple airfoils 28, with another third type spar 82 disposed on each side of the one third type spar 82, adjacent thereto, and spaced between an adjacent pair of the first type spars 78 of the forwardmost airfoil 72, and with the second type spars 80 disposed outboard of the another third type spars 82 and also spaced between an adjacent pair of the first type spars 78 of the forwardmost airfoil 72.

The leading end 84 of each third type spar 80 has a support spacer 90 that extends forwardly and dependingly therefrom, past the leading edge 96 of the intermediate airfoil 76, and which is bifurcated to receive and space the trailing edge 70 of the forwardmost airfoil 72 slightly below the leading edge 96 of the intermediate airfoil 76 so as to form a first air space 92 therebetween.

The rearwardmost airfoil 74 of the multiple airfoils 28 contains a fourth type spar 94 that is identical to each of the plurality of third type spars 82, and extends laterally along the lateral centerline 75 of the rearwardmost airfoil 74 of the multiple airfoils 28.

Each fourth type spar 94 further has the second throughbore 88 therethrough that receives the rearwardmost intermediate rod 64 of the frame 26, and a third throughbore 95 that receives the rearwardmost rod 62 of the frame 26.

The rearwardmost airfoil 74 of the multiple airfoils 28 further contains a plurality of fifth type spars 96 that are identical to the fourth type spars 94, are parallel to each other, and have leading ends 98 and trailing ends 100.

Each fifth type spar 96 is shaped to match the profile of the rearwardmost airfoil 74 of the multiple airfoils 28, and has a fourth throughbore 102 that receives the rearwardmost intermediate rod 64 of the frame 26 therethrough and a fifth throughbore 104 that receives the rearwardmost rod 62 of the frame 26 therethrough.

The leading end 98 of each fifth type spar 96 has the support spacer 90 which receives and spaces the trailing edge 70 of the intermediate airfoil 76 slightly below the leading edge 68 of the rearwardmost airfoil 74 so as to form a second air space 105 therebetween.

The rearwardmost airfoil 74 further contains a plurality of sixth type spars 106 that are identical to the plurality of first type spars 78, are parallel to each other, and extend laterally and are longitudinally spaced-apart from each other, and have the first throughbore 79 that receives the rearwardmost intermediate rod 64 of the frame 26 therethrough and a sixth throughbore 108 that receives the rearwardmost rod 62 of the frame .26 therethrough.

One fourth type spar 94 extends along the lateral centerline 75 of the rearwardmost airfoil 74 of the multiple airfoils 28, with a pair of sixth type spars 106 disposed on each side of, and adjacent to, the one fourth type spar 94, with each fifth type spar 96 disposed outboard of an associated pair of the sixth type spars 106, and with another sixth type spar 106 disposed outboard of each fifth type spar 96.

The support spacer 90 of each fifth type spar 96 receives and spaces the trailing edge 70 of the intermediate airfoil 76 slightly below the leading edge 68 of the rearwardmost airfoil 74 so as to further form the second air space 105 therebetween.

The support spacer 90 of each fifth type spar 96 has a rear pivot support 109 that extends dependingly therefrom, and which has a pivot throughopening 110 therethrough.

Each of a pair of the first type spars 78 that evenly straddle the lateral centerline 73 of the forwardmost airfoil ,72 of the multiple airfoils 28 has a front pivot support 112 that depends from slightly behind the leading end 71 thereof and which is pivotally mounted to an associated longitudinal member 32 of the base 30 of the frame 26.

The front pivot support 112 is a leg 114 that terminates in a free end 116 that has a throughbore 118 that is pivotally mounted to the associated longitudinal member 32 of the base 30 of the frame 26 by a pivot pin 120 disposed slightly rearwardly of the forwardmost terminal end 34 of the associated longitudinal member 32 of the base 30 of the frame 26.

The front pivot support 112 is a leg 122 that terminates in a free end 124 that has a throughbore 126 that is pivotally mounted to a throughbore 128 in a free end 130 of another leg 132 128 by a pivot pin 134, with the another leg 132 of the front pivot support 112 extending upwardly from the associated longitudinal member 32 of the base 30 of the frame 26, slightly rearwardly of the forwardmost terminal end 34 of the associated longitudinal member 32 of the base 30 of the frame 26.

The air deflector 20 further comprises apparatus 136 for adjusting the angle of attack thereof.

The apparatus 136 comprises a pair of turn buckles 138 with adjustable lengths, each of which has an uppermost terminal end 140 that is pivotally mounted to the pivot throughopening 110 of the rear pivot support 109 of an associated fifth type spar 96, and a lowermost terminal end 142 that is pivotally and replaceably mounted to the rearwardmost terminal end 36 of an associated longitudinal member 32 of the base 30 of the frame 26 when the air deflector 20 is in use and has a functional angle of attack, with the adjustable length of the turnbuckle 138 determining the angle of attack, and then removed therefrom, and moved forwardly to an intermediate position 144 on the associated longitudinal member 32 of the base 30 of the frame 26 when the air deflector is not in use and has no functional angle of attack.

Figure 13:
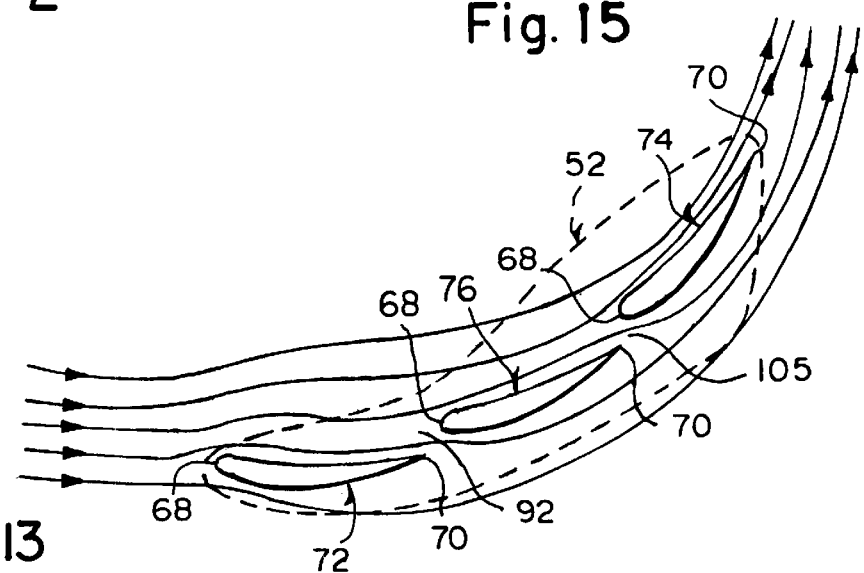
FIG. 13 is a diagrammatic side elevational view of the air flow past the multiple tandem airfoils of the present invention shown in FIG. 11.

The operation of the air deflector 20 can best be seen in FIGS. 11–13, and as such, will be discussed with reference thereto.

The forwardmost airfoil 72 of the multiple airfoils 28 has an angle of attack 146 that is shallow relative to the base 30 of the frame 26, the intermediate airfoil 76 of the multiple airfoils 28 has an angle of attack 148 that is larger than the angle of attack 146 of the forwardmost airfoil 72 of the multiple airfoils 28, and the rearwardmost airfoil 74 of the multiple airfoils 28 has an the angle of attack 150 that is larger than the angle of attack 148 of the intermediate airfoil 76 of the multiple airfoils 28 so as to provide a progressively increasing angle of attack for the air deflector 20, from the forwardmost airfoil 72 of the multiple airfoils 28 to the rearwardmost airfoil 74 of the multiple airfoils 28 that gently, but progressively, diverts airflow upwardly at a controlled rate to prevent stall.

The forwardmost airfoil 72, the intermediate airfoil 76, and the rearwardmost airfoil 72 are disposed in such a tandem orientation that airflow thereacross is laminar which eliminates turbulence so as to minimize boundary layer separation and the resulting eddies and slip caused thereby.

Air flowing over the forwardmost airfoil 72 of the multiple airfoils 28 flows through the first air space 92 and under the intermediate airfoil 76 of the multiple airfoils 28 and air flowing over the intermediate airfoil 76 of the multiple airfoils 28 flow through the second air space 105 and under the rearwardmost airfoil 74 of the multiple airfoils 28 so as to eliminate wake formation at the trailing edges 70 of the forwardmost airfoil 72 and the intermediate airfoil 76 of the multiple airfoils 28.

Figure 15:
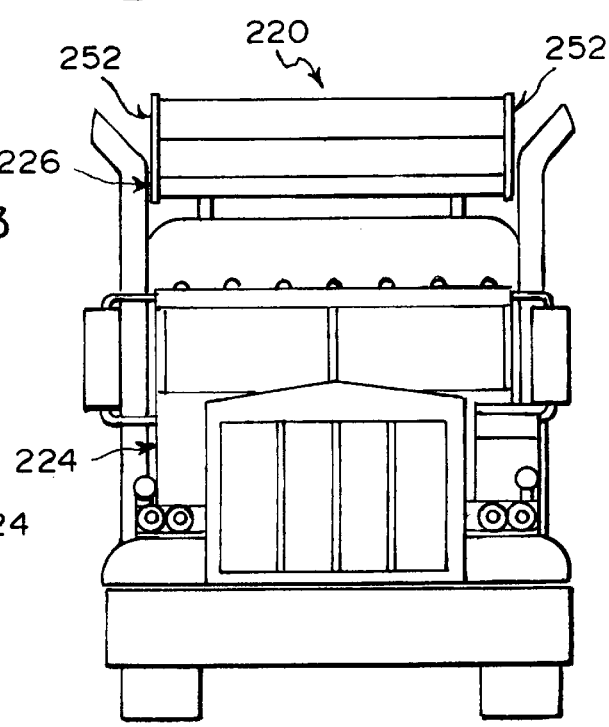
FIG. 15 is an enlarged diagrammatic front elevational view taken generally in the direction of arrow 15 in FIG. 13.

A second embodiment of the air deflector 220 can best be seen in FIGS. 14 and 15, and as such, will be discussed with reference thereto.

The air deflector 220 is identical to the air deflector 20, except that the pair of side fences 252 of the frame 226 are parallel to each other for providing a surface for trailers that are as wide as the vehicles towing them, such as a tractor trailer 224.

It will be understood that each of the elements described above, or two or more together, may also find a useful application in other types of constructions differing from the types described above.

While the invention has been illustrated and described as embodied in an air deflector having multiple airfoils disposed in tandem to the direction of travel and having variably increasing pitches communicating smoothly with each other, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An air deflector for use on a roof of a cab of a vehicle and having an angle of attack, comprising:
    a) a frame for attaching to the roof of the cab of the vehicle; and
    b) multiple airfoils mounted to said frame, wherein said frame comprises a base, wherein said base of said frame comprises:
        A) a pair of longitudinal members that are tubular and have:
            i) forwardmost terminal ends; and
            ii) rearwardmost terminal ends; and
        B) a pair of lateral members that are tubular and rectilinearly connected to said pair of longitudinal members of said base of said frame, to form corners, wherein said frame further comprises a Pair of side fences that are laterally spaced-apart from each other and generally rearwardly inclined, and have:
            i) leading ends; and
            ii) trailing ends, wherein each side fence of said frame is pivotally mounted to an associated longitudinal member of said base of said frame.

2. The deflector as defined in claim 1, wherein said base of said frame comprises four bars that are U-shaped, with a pair of each spaced-apart from each other and depending from an associated longitudinal member of said base of said frame.

3. The deflector as defined in claim 2, wherein said base of said frame further comprises four straps that are flexible, each of which depends freely from an associated bar of said base of said frame, to a terminal end.

4. The deflector as defined in claim 3, wherein said base of said frame further comprises four clasps, each of which is freely disposed on said terminal end of an associated strap of said base of said frame for engaging the cab of the vehicle.

5. The deflector as defined in claim 1, wherein said base of said frame comprises a bed rail mounting system for demonstrating inherent flexibility of use.

6. The deflector as defined in claim 1, wherein one first type spar extends along said lateral centerline of said forwardmost airfoil of said multiple airfoils, with remaining first type spars disposed outboard of, and to both sides of, said one first type spar.

7. The deflector as defined in claim 1, wherein said pair of side fences of said frame flare rearwardly outwardly from each other for providing a taller and wider surface for trailers that are wider and taller than the vehicles towing them.

8. The deflector as defined in claim 1, wherein said pair of side fences of said frame are parallel to each other for providing a surface for trailers that are as wide as the vehicles towing them.

9. An air deflector for use on a roof of a cab of a vehicle and having an angle of attack, comprising:
   a) a frame for attaching to the roof of the cab of the vehicle; and
   b) multiple airfoils mounted to said frame, wherein said frame comprises a base, wherein said base of said frame comprises:
      A) a pair of longitudinal members that are tubular and have:
         i) forwardmost terminal ends; and
         ii) rearwardmost terminal ends; and
      B) a pair of lateral members that are tubular and rectilinearly connected to said pair of longitudinal members of said base of said frame, to form corners, wherein said frame further comprises a pair of side fences that are laterally spaced-apart from each other and generally rearwardly inclined, and have:
         i) leading ends; and
         ii) trailing ends, wherein said frame further comprises four rods that are tandemly space-apart from, and parallel to, each other, and extend perpendicularly laterally from one side fence of said frame to another side fence of said frame.

10. The deflector as defined in claim 1, wherein said base of said frame further comprises four suction cups, each of which depends from an associated corner of said base of said frame for engaging the roof of the cab of the vehicle.

11. The deflector as defined in claim 9, wherein said four rods of said frame comprise:
   a) a forwardmost rod that extends across said leading ends of said pair of side fences of said frame;
   b) a rearwardmost rod that extends across said trailing ends of said pair of side fences of said frame;
   c) a rearwardmost intermediate rod that extends forwardly of said rearwardmost rod of said frame; and
   d) a forwardmost intermediate rod that extends between said rearwardmost intermediate rod of said frame and said forwardmost rod of said frame.

12. The deflector as defined in claim 11, wherein said multiple airfoils comprise three airfoils that are tandemly spaced-3 apart from, and parallel to, each other, each which has a negative chamber for increasing downward force and traction, a leading edge and a trailing edge, and extends perpendicularly laterally from one side fence of said frame to another side fence of said frame.

13. The deflector as defined in claim 12, wherein said three airfoils comprise a forwardmost airfoil that has a lateral centerline, a profile, and extends across said leading ends of said pair of side fences of said frame, with said forwardmost rod of said frame extending longitudinally therethrough, slightly rearwardly of said leading edge of said forwardmost airfoil of said multiple airfoils.

14. The deflector as defined in claim 13, wherein said three airfoils further comprise a rearwardmost airfoil that has a lateral centerline, a profile, and extends across said trailing ends of said pair of side fences of said frame, with said rearwardmost rod of said frame extending longitudinally therethrough, slightly forwardly of said trailing edge of said rearwardmost airfoil of said multiple airfoils, and with said rearwardmost intermediate rod of said frame extending longitudinal therethrough, slightly rearwardly of said leading edge of said rearwardmost airfoil of said multiple airfoils.

15. The deflector as defined in claim 14, wherein said three airfoils further comprise an intermediate airfoil that has a lateral centerline, a profile, and extends across said pair of side fences of said frame, between, connected to, and spaced from, said forwardmost airfoil of said multiple airfoils and said rearwardmost airfoil of said multiple airfoils, with said forwardmost intermediate rod of said frame extending longitudinal therethrough, slightly rearwardly of said leading edge of said intermediate airfoil of said multiple airfoils.

16. The deflector as defined in claim 15, wherein said forwardmost airfoil of said multiple airfoils contains a plurality of first type spars that are parallel to each other and extend laterally and are longitudinally spaced-apart from each other, and have:
   a) leading ends; and
   b) trailing ends, wherein each first type spar is shaped to match said profile of said forwardmost airfoil of said multiple airfoils, and has a first throughbore that is disposed slightly rearwardly of said leading end thereof that receives said forwardmost rod of said frame therethrough, wherein said intermediate airfoil of said multiple airfoils contains a plurality of second type sears that are identical to said plurality of first type spars, are parallel to each other, and extend laterally and are longitudinally spaced-apart from each other, wherein said intermediate airfoil of said multiple airfoils further contains a plurality of third type spars that are parallel to each other and have:
      A) leading ends; and
      B) trailing ends.

17. The deflector as defined in claim 16, wherein each third type spar is shaped to match said profile of said intermediate airfoil of said multiple airfoils, and has a second throughbore that receives said forwardmost intermediate rod of said frame therethrough.

18. The deflector as defined in claim 17, wherein said leading end of each third type spar has a support spacer that extends forwardly and dependingly therefrom, past said leading edge of said intermediate airfoil, and which is bifurcated to receive and space said trailing edge of said forwardmost airfoil slightly below said leading edge of said intermediate airfoil so as to form a first air space therebetween.

19. The deflector as defined in claim 18, wherein said rearwardmost airfoil of said multiple airfoils contains a fourth type spar that is identical to each of said plurality of third type spars, and extends laterally along said lateral centerline of said rearwardmost airfoil of said multiple airfoils.

20. The deflector as defined in claim 19, wherein each fourth type spar further has said second throughbore therethrough, that receives said rearwardmost intermediate rod of said frame, and a third throughbore that receives said rearwardmost rod of said frame.

21. The deflector as defined in claim 19, wherein said rearwardmost airfoil of said multiple airfoils further contains a plurality of fifth type spars that are identical to said fourth type spars, are parallel to each other, and have:
a) leading ends; and
b) trailing ends.

22. The deflector as defined in claim 21, wherein each fifth type spar is shaped to match said profile of said rearwardmost airfoil of said multiple airfoils, and has a fourth throughbore that receives said rearwardmost intermediate rod of said frame therethrough and a fifth throughbore that receives said rearwardmost rod of said frame therethrough.

23. The deflector as defined in claim 21, wherein said leading end of each fifth type spar has said support spacer which receives and spaces said trailing edge of said intermediate airfoil slightly below said leading edge of said rearwardmost airfoil so as to form a second air space therebetween.

24. The deflector as defined in claim 23, wherein air flowing over said forwardmost airfoil of said multiple airfoils flows through said first air space and under said intermediate airfoil of said multiple airfoils and air flowing over said intermediate airfoil of said multiple airfoils flows through said second air space and under said rearwardmost airfoil of said multiple airfoils so as to eliminate wake formation at said trailing edges of said forwardmost airfoil and said intermediate airfoil of said multiple airfoils.

25. The deflector as defined in claim 16, wherein one third type spar extends along said lateral centerline of said intermediate airfoil of said multiple airfoils, with another third type spar disposed on each side of said one third type spar, adjacent thereto and spaced between an adjacent pair of said first type spars of said forwardmost airfoil, and with said second type spars disposed outboard of said another third type spar and also spaced between an adjacent pair of said first type spars of said forwardmost airfoil.

26. The deflector as defined in claim 16, wherein each of a pair of said first type spars that evenly straddle said lateral centerline of said forwardmost airfoil of said multiple airfoils has a front pivot support that depends from slightly behind said leading end thereof and which is pivotally mounted to an associated longitudinal member of said base of said frame.

27. The deflector as defined in claim 15, wherein said forwardmost airfoil of said multiple airfoils has an angle of attack that is shallow relative to said base of said frame, said intermediate airfoil of said multiple airfoils has an angle of attack that is larger than said angle of attack of said forwardmost airfoil of said multiple airfoils, and said rearwardmost airfoil of said multiple airfoils has an said angle of attack that is larger than said angle of attack of said intermediate airfoil of said multiple airfoils so as to provide a progressively increasing angle of attack for said air deflector, from said forwardmost airfoil of said multiple airfoils to said rearwardmost airfoil of said multiple airfoils that gently, but progressively, diverts airflow upwardly at a controlled rate to prevent stall.

28. The deflector as defined in claim 15, wherein said forwardmost airfoil, said intermediate airfoil, and said rearwardmost airfoil of said multiple airfoils are disposed in such a tandem orientation that airflow thereacross is laminar which eliminates turbulence so as to minimize boundary layer separation and eddies resulting thereby and slip caused thereby.

29. The deflector as defined in claim 9, wherein said base of said frame further comprises four suction cups, each of which depends from an associated corner of said base of said frame for engaging the roof of the cab of the vehicle.

30. The deflector as defined in claim 9, wherein said base of said frame comprises four bars that are U-shaped, with a pair of each spaced-apart from each other and depending from an associated longitudinal member of said base of said frame.

31. The deflector as defined in claim 30, wherein said base of said frame further comprises four straps that are flexible, each of which depends freely from an associated bar of said base of said frame, to a terminal end.

32. The deflector as defined in claim 31, wherein said base of said frame further comprises four clasps, each of which is freely disposed on said terminal end of an associated strap of said base of said frame for engaging the cab of the vehicle.

33. The deflector as defined in claim 9, wherein said base of said frame comprises a bed rail mounting system for demonstrating inherent flexibility of use.

34. The deflector as defined in claim 9, wherein said pair of side fences of said frame flare rearwardly outwardly from each other for providing a taller and wider surface for trailers that are wider and taller than the vehicles towing them.

35. The deflector as defined in claim 9, wherein said pair of side fences of said frame are parallel to each other for providing a surface for trailers that are as wide as the vehicles towing them.

36. The deflector as defined in claim 26, wherein said front pivot support is a leg that terminates in a free end that has a throughbore that is pivotally mounted to said associated longitudinal member of said base of said frame by a pivot pin disposed slightly rearwardly of said forwardmost terminal end of said associated longitudinal member of said base of said frame.

37. The deflector as defined in claim 26, wherein said front pivot support is a leg that terminates in a free end that has a throughbore that is pivotally mounted to a throughbore in a free end of another leg by a pivot pin, with said another leg of said front pivot support extending upwardly from said associated longitudinal member of said base of said frame, slightly rearwardly of said forwardmost terminal end of said associated longitudinal member of said base of said frame.

38. The deflector as defined in claim 21, wherein said rearwardmost airfoil further contains a plurality of sixth type spars that are identical to said plurality of first type spars, are parallel to each other, and extend laterally and are longitudinally spaced-apart from each other, and have said first throughbore that receives said rearwardmost intermediate rod of said frame therethrough and a sixth throughbore that receives said rearwardmost rod of said frame therethrough.

39. The deflector as defined in claim 38, wherein one fourth type spar extends along said lateral centerline of said rearwardmost airfoil of said multiple airfoils, with a pair of sixth type spars disposed on each side of, and adjacent to, said one fourth type spar, with each fifth type spar disposed outboard of an associated pair of said sixth type spars, and with another sixth type spar disposed outboard of each fifth type spar.

40. The deflector as defined in claim 23, wherein said support spacer of each fifth type spar receives and spaces said trailing edge of said intermediate airfoil slightly below said leading edge of said rearwardmost airfoil so as to further form said second air space therebetween.

41. The deflector as defined in claim 23, wherein said support spacer of each fifth type spar has a rear pivot support that extends dependingly therefrom, and which has a pivot throughopening therethrough.

42. The deflector as defined in claim 41, further comprising apparatus for adjusting said angle of attack of said air deflector.

43. The deflector as defined in claim 42, wherein said apparatus comprises a pair of turn buckles with adjustable lengths, each of which has an uppermost terminal end that is pivotally mounted to said pivot throughopening of said rear pivot support of an associated fifth type spar, and a lowermost terminal end that is pivotally and replaceably mounted to said rearwardmost terminal end of an associated longitudinal member of said base of said frame when said air deflector is in use and has a functional angle of attack, with said adjustable length of said turnbuckle determining said angle of attack, and then removed therefrom, and moved forwardly to an intermediate position on said associated longitudinal member of said base of said frame when said air deflector is not in use and has no functional angle of attack.

* * * * *